(12) United States Patent
Jeon et al.

(10) Patent No.: US 9,454,964 B2
(45) Date of Patent: Sep. 27, 2016

(54) INTERFACING DEVICE AND METHOD FOR SUPPORTING SPEECH DIALOGUE SERVICE

(71) Applicant: Samsung Electronics Co., Ltd., Suwon-si, Gyeonggi-do (KR)

(72) Inventors: Hayoung Jeon, Seoul (KR); Sora Kim, Seoul (KR); Heewoon Kim, Suwon-si (KR); Yumi Ahn, Hanam-si (KR); Jihyun Ahn, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/450,810

(22) Filed: Aug. 4, 2014

(65) Prior Publication Data

US 2015/0039307 A1 Feb. 5, 2015

(30) Foreign Application Priority Data

Aug. 5, 2013 (KR) ........................ 10-2013-0092649

(51) Int. Cl.
| | |
|---|---|
| *G10L 15/26* | (2006.01) |
| *G06F 3/16* | (2006.01) |
| *G10L 15/22* | (2006.01) |
| *G06K 9/62* | (2006.01) |

(52) U.S. Cl.
CPC .............. *G10L 15/26* (2013.01); *G06F 3/167* (2013.01); *G10L 15/22* (2013.01); *G06K 9/6253* (2013.01); *G06K 9/6293* (2013.01)

(58) Field of Classification Search
CPC ... H04M 3/4938; G10L 15/26; G06F 17/2705; G06F 17/2785; G06F 17/3089
USPC ........... 704/235, 9, 255, 257, 260, 266, 268, 704/270.1, E15.045, E15.047; 379/88.04; 455/414.1; 709/219
See application file for complete search history.

(56) References Cited

U.S. PATENT DOCUMENTS

| 8,358,748 | B2 * | 1/2013 | Harvey ...................... 379/88.04 |
| 2005/0038814 | A1 | 2/2005 | Iyengar et al. |
| 2009/0216531 | A1 | 8/2009 | Yanagihara |

FOREIGN PATENT DOCUMENTS

WO 2011/116309 A1 9/2011

\* cited by examiner

*Primary Examiner* — Charlotte M Baker
(74) *Attorney, Agent, or Firm* — Jefferson IP Law, LLP

(57) ABSTRACT

An interfacing device and method to support a speech dialogue service based on a multi-modal input are provided. The method includes executing an interface for the speech dialogue service, receiving a user input, through the executed interface, including a voice input and a non-voice input, transmitting, as a request signal to a server, at least one of the voice input or a text extracted from the voice input when the received user input is the voice input, transmitting, as the request signal to the server, a text extracted from the non-voice input when the received user input is the non-voice input, receiving a result of dialogue recognition in response to the request signal from the server, and executing a response to the received user input on the basis of the received result of dialogue recognition.

13 Claims, 7 Drawing Sheets

FIG. 5

| EXTRACTED TEXT | EXTRACTED TEXT TYPE | ASSOCIATED CP |
|---|---|---|
| 8 Rue du Fouarre 75005 Paris, France | Location (address) | Map services |
| Samsung, Sennheiser, Ferrari | Company name | Search web |
| Dark knight, Spider man | Contents name (Movie) | Movie services app. |

INTERFACING DEVICE AND METHOD FOR SUPPORTING SPEECH DIALOGUE SERVICE

CROSS-REFERENCE TO RELATED APPLICATION(S)

This application claims the benefit under 35 U.S.C. §119(a) of a Korean patent application filed on Aug. 5, 2013 in the Korean Intellectual Property Office and assigned Serial number 10-2013-0092649, the entire disclosure of which is hereby incorporated by reference.

TECHNICAL FIELD

The present disclosure relates to an interfacing device and method for supporting a speech dialogue service. More particularly, the present disclosure relates to offering a speech dialogue service allowing a multi-modal input.

BACKGROUND

A speech dialogue service allows a voice-based interaction between a user and a voice agent. Currently, such a speech dialogue service is offered by many interfacing devices including various portable terminals. Typical interfacing devices supporting a speech dialogue service. However, often the speech dialogue service fails to sufficiently utilize any input/output interface other than voice, thus limiting expression. Further, as the length of a voice input increases, a possibility of errors in voice recognition may also increase.

In view of the above issues, multi-modal interface techniques based on various interfaces have been introduced.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an interfacing device and method for executing a speech dialogue service based on a multi-modal input.

In accordance with an aspect of the present disclosure, an interfacing method for supporting a speech dialogue service is provided. This method comprises executing an interface for the speech dialogue service; receiving a user input, through the executed interface, including a voice input and a non-voice input; transmitting, as a request signal to a server, at least one of the voice input or a text extracted from the voice input when the received user input is the voice input; transmitting, as the request signal to the server, a text extracted from the non-voice input when the received user input is the non-voice input; receiving a result of dialogue recognition in response to the request signal from the server; and executing a response to the received user input on the basis of the received result of dialogue recognition.

In accordance with another aspect of the present disclosure, an interfacing device for supporting a speech dialogue service is provided. This device comprises an input unit configured to receive a user input including a voice input and a non-voice input; a communication unit configured to communicate with a server; a control unit configured to execute an interface for the speech dialogue service, to receive the user input through the executed interface, to transmit, as a request signal to the server, at least one of the voice input or a text extracted from the voice input when the received user input is the voice input, to transmit, as the request signal to the server, a text extracted from the non-voice input when the received user input is the non-voice input, to receive a result of dialogue recognition in response to the request signal from the server; and to execute a response to the received user input on the basis of the received result of dialogue recognition; and an output unit configured to output a result of executing the response to the received user input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 5 is a table illustrating an example of determining an associated content provider at a server according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein maybe made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a signal" includes reference to one or more of such signals.

In this disclosure, the term multi-modal refers to the use of input/output mechanisms of various types in an interface between a human being and a machine, and thus a multi-modal input may utilize voice recognition, a keyboard, a keypad, a touch sensor, an image capture, and the like. Additionally, the term a voice input refers to an input of a user's voice received through a microphone. A voice input is a normal interfacing type offered in a speech dialogue service. In contrast, the term a non-voice input refers to any input other than such a voice input. If an input mode switch is performed at a normal voice interfacing, an input is received by means of a switched interfacing type.

Figure 1:
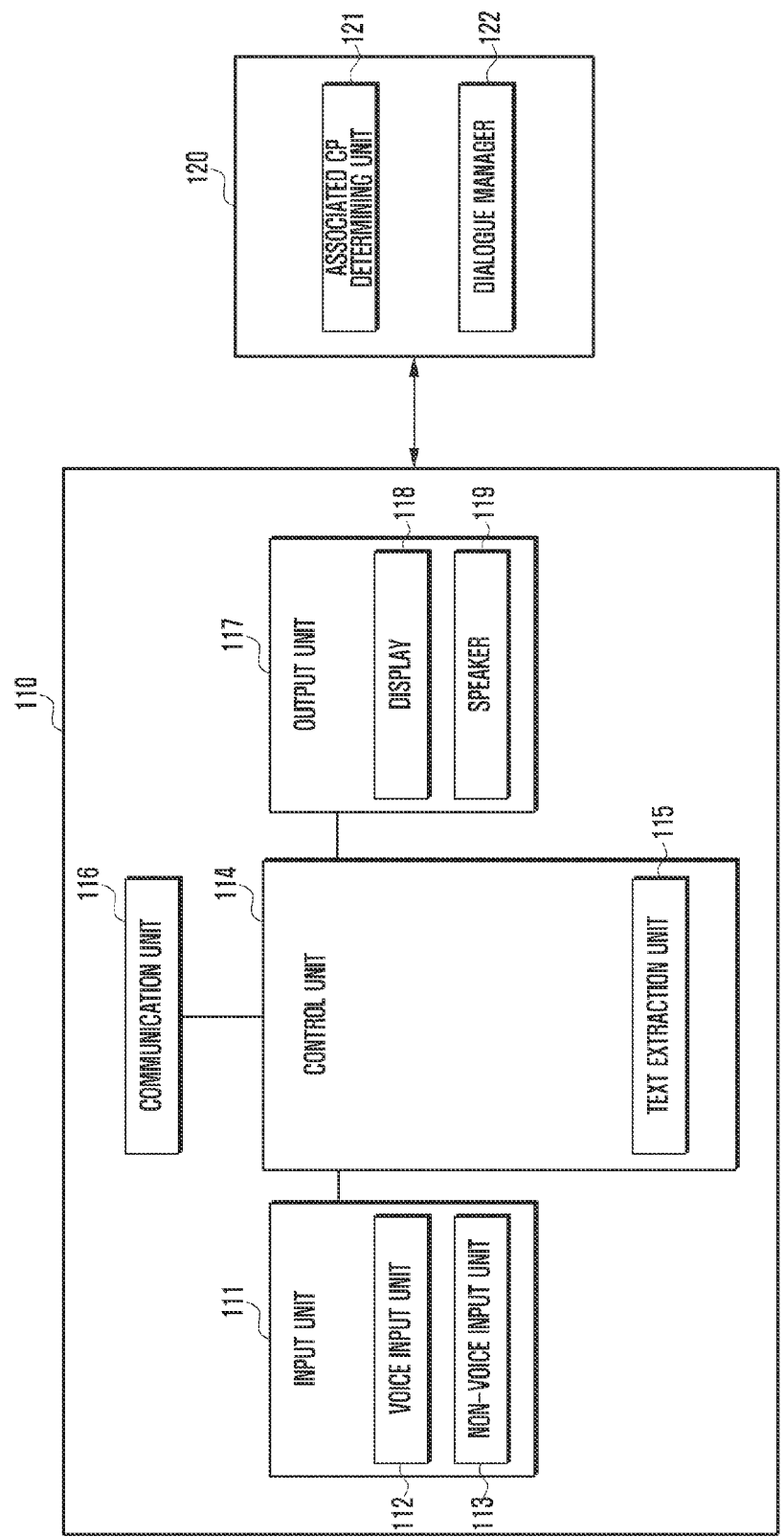
FIG. 1 is a block diagram illustrating a system for supporting a speech dialogue service according to an embodiment of the present disclosure.

FIG. 1 is a block diagram illustrating a system for supporting a speech dialogue service according to an embodiment of the present disclosure.

Referring to FIG. 1, the system for supporting a speech dialogue service includes an interfacing device 110 and a server 120.

The interfacing device 110 is a device that supports a speech dialogue service between a user and a voice agent. The interfacing device 110 has the ability to communicate with the server 120 via a network in order to derive a response to a user input from a voice agent. A voice agent may refer to a virtual entity that executes a voice interaction with a user in a speech dialogue service.

The interfacing device 110 may include an input unit 111, a control unit 114, a communication unit 116, and an output unit 117, but is not limited thereto.

The input unit 111 is configured to perform a function of receiving a user input in a speech dialogue service. The input unit 111 may include a voice input unit 112 for receiving a user's voice input, and a non-voice input unit 113 for receiving a non-voice input other than a voice input. The voice input unit 112, which may be a microphone for example, may receive a user's voice input and convert it into a voice input signal. The non-voice input unit 113 may receive a user's non-voice input such as text, image, music, and the like. Text may be received as a user input through a keyboard input, a touch sensor gesture input, a text copy input, and the like. Images may be received as a user input through a camera function, an image selection from a list of stored images, an image copy input, and the like. Music may be received as a user input while being played through a music player. As will be understood by those skilled in the art, any other input mode may be applied as an input interfacing type.

The control unit 114 controls the execution of a speech dialogue service. Specifically, the control unit 114 may process a user input signal received from the input unit 111 and then transmit the user input signal to the output unit 117 and the server 120.

In case a voice input is received, the control unit 114 may convert a voice input signal into text and then output the text to the output unit 117 to display a user input. Additionally, the control unit 114 may transmit, as a request signal, such a voice input signal or text to the server 120. When a result of dialogue recognition is received from the server 120 in response to such a request signal, the control unit 114 may execute a particular function corresponding to the received result of dialogue recognition and then output a response to the output unit 117.

Further, in case a non-voice input is received, the control unit 114 may include a text extraction unit 115 for extracting text from a non-voice signal. If an image or music file containing metadata is inputted for example, the text extraction unit 115 may recognize text of metadata contained in the image or music file and perform a filtering process for selecting essential text. For example, when metadata has a description (i.e., keyword), a saving time, a copyright holder, and any other file information, a description may be predefined to be selected as essential text in a filtering process. This is, however, exemplary only and not to be considered as a limitation of the present disclosure.

Also, in case of an image file containing characters, the text extraction unit 115 may recognize text contained in the image file through an Optical Character Recognition (OCR) process. A specific part of text desired by a user may be selected in a filtering process. This filtering process may be performed according to a predefined rule or a user's selection.

The control unit 114 may output the extracted text of non-voice input to the output unit 117 to display a user input. Additionally, the control unit 114 may transmit, as a request signal, such extracted text of non-voice input to the server 120. When a result of dialogue recognition is received from the server 120 in response to such a request signal, the control unit 114 may execute a particular function corresponding to the received result of dialogue recognition and then output a response to the output unit 117.

After the transmission of a request signal to the server 120, the control unit 114 may receive from the server 120 a message that inquires whether to apply an associated content provider. Determination of an associated content provider will be described below.

The communication unit 116 is configured to support a communication between the interfacing device 110 and the server 120 through a wired or wireless network.

The output unit 117 may receive a dialogue content signal (i.e., a processed user input signal and a response signal of a voice agent), from the control unit 114 and then output the dialogue content signal while a speech dialogue service is executed. Specifically, the output unit 117 may include a display 118 and a speaker 119. In case a visual signal is not required for a dialogue content signal, a response of a voice agent may be outputted by means of sound only by turning off the display 118 and turning on the speaker 119. Alternatively, the display 118 may be also turned on so as to display as text a user input and a response of a voice agent. If a user input is received as a non-voice input, the display 118 may be turned on to display text of the extracted non-voice input. Besides, the output unit 117 may display various functions and contents offered in a speech dialogue service.

The server 120 is configured to receive a user input (i.e., a request signal), from the interfacing device 110, to derive a response to the request signal from a voice agent, and to transmit a deriving result to the interfacing device 110. When a voice signal is received from the interfacing device 110, the server 120 may perform a function to convert the received voice signal into text.

The server 120 may include a dialogue manager 122, which derives a response of a voice agent from database on the basis of text corresponding to a user input. If text "Google" is recognized for example, the dialogue manager 122 may determine that a user desires "Google search", and thereby may derive a result "access to Google homepage" as a system response. This dialogue result may be transmitted to the interfacing device 110, and then the interfacing device 110 may perform access to a homepage of Google.

Meanwhile, the server 120 may further include an associated Content Provider (CP) determining unit 121 that determines an associated content provider on the basis of text corresponding to a user input. Namely, the type of text is determined according to a weighted value of each category of words contained in text, and then an associated content provider is derived from the type of text. For example, if it is determined that a word contained in text is an address type, a map service may be derived as an associated content provider. Additionally, the server 120 may inquire whether to apply an associated content provider, namely, may request the interfacing device 110 to check the applicability of a map service. If a user accepts the applicability of an associated content provider, the dialogue manager 122 may derive and offer a response of a voice agent on the basis of the associated content provider.

Figure 2:
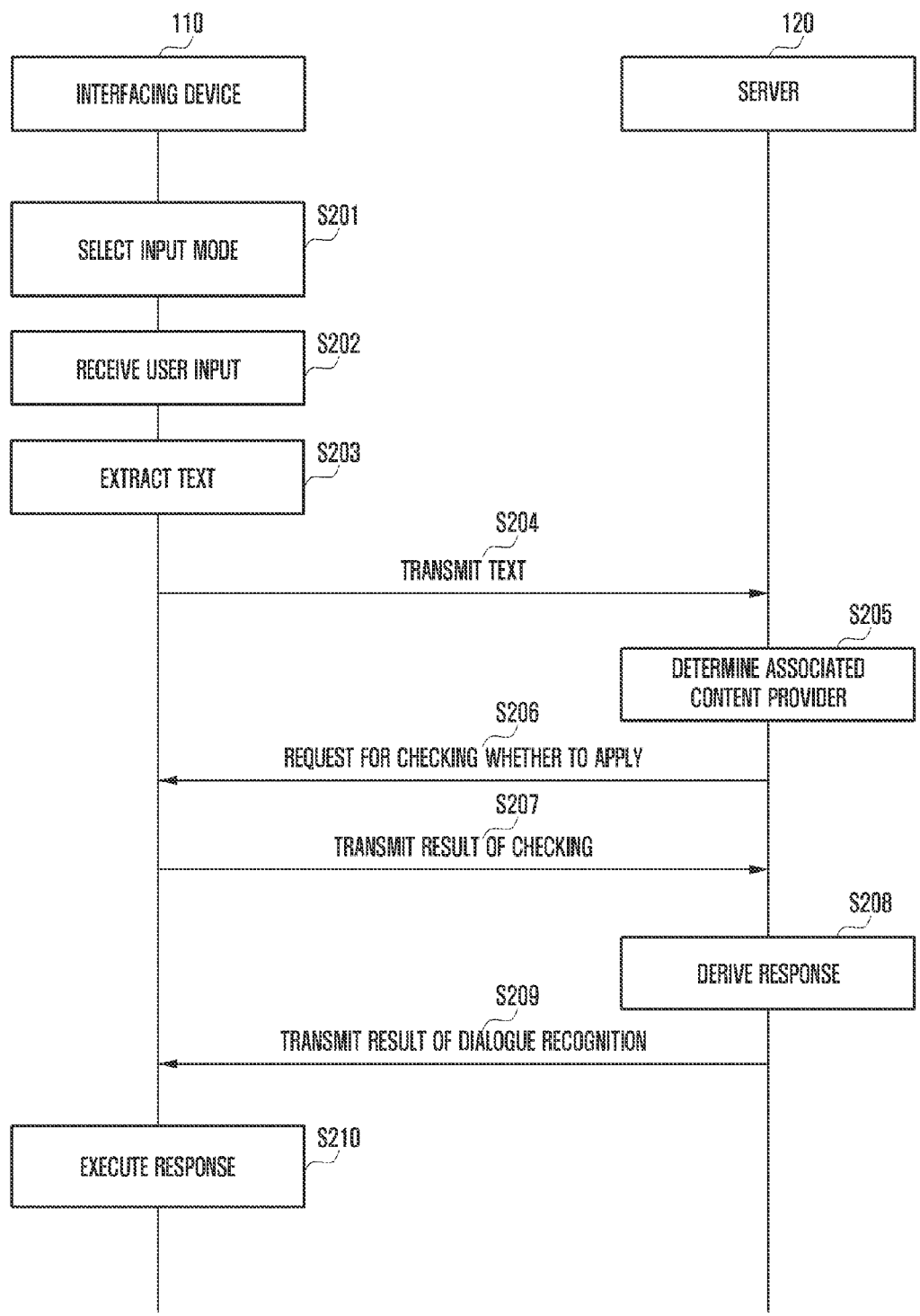
FIG. 2 is a flow diagram illustrating a method for executing a speech dialogue service at a system according to an embodiment of the present disclosure.

FIG. 2 is a flow diagram illustrating a method for executing a speech dialogue service at a system according to an embodiment of the present disclosure.

Referring to FIG. 2, at operation S201, the interfacing device 110 may select an input mode. A voice input may be set as a default input mode of a speech dialogue service, and thereafter a switch of input modes may be performed through a voice command. For example, if a voice command "open camera" is received, the interfacing device 110 may switch an input mode to an image input through a camera.

At operation S202, the interfacing device 110 may receive a user input on the basis of the selected input mode. Then, at operation S203, the interfacing device 110 may extract text, which is content of dialogue, from the received user input as previously discussed in FIG. 1.

Thereafter, at operation S204, the interfacing device 110 may transmit the extracted text to the server 120. Optionally, at operation S205, the server 120 may determine an associated content provider from the received text. At operation S206, the server 120 may transmit to the interfacing device 110, a request for checking the applicability of the associated content provider. Then, at operation S207, the interfacing device 110 may transmit to the server 120 a result of checking the applicability of the associated content provider.

At operation S208, the server 120 may derive a response of a voice agent by totally considering the received text and the received checking result for the applicability of the associated content provider. Then, at operation S209, the server 120 may transmit to the interfacing device 110 a result of dialogue recognition based on the derived response.

At operation S210, the interfacing device 110 may execute a response on the basis of the received dialogue recognition result and offer it to a user.

Figure 3:
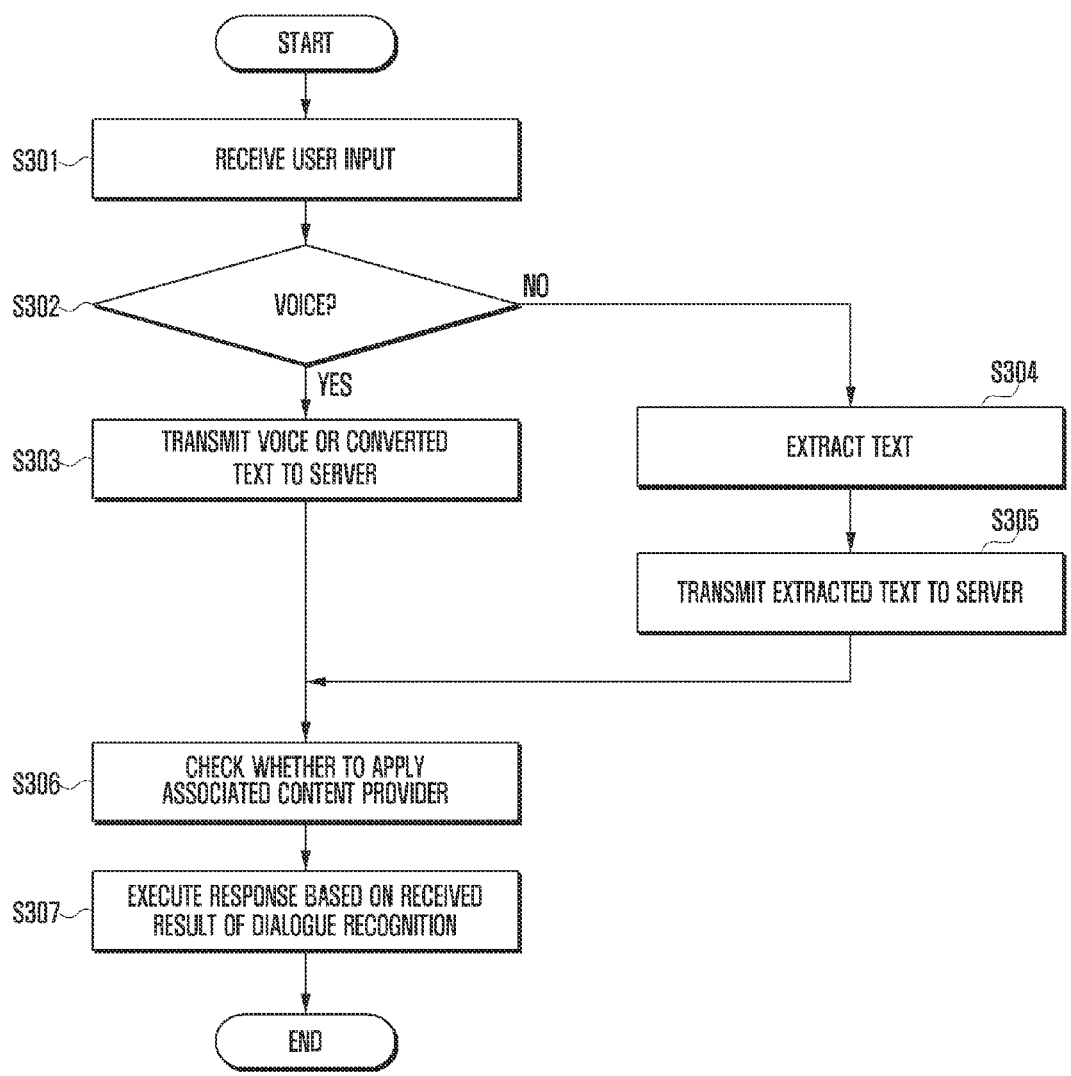
FIG. 3 is a flow diagram illustrating a method for executing a speech dialogue service at an interfacing device according to an embodiment of the present disclosure.

FIG. 3 is a flow diagram illustrating a method for executing a speech dialogue service at an interfacing device according to an embodiment of the present disclosure.

Referring to FIG. 3, the interfacing device 110 receives a user input at operation S301 and then determines at operation S302 whether the received user input is a voice input. In case of a voice input, the interfacing device 110 transmits to the server 120 such a voice or text converted from the voice at operation S303.

In contrast, in case of a non-voice input, the interfacing device 110 extracts text from the non-voice input at operation S304 and then transmits the extracted text to the server 120 at operation S305.

Figure 4:
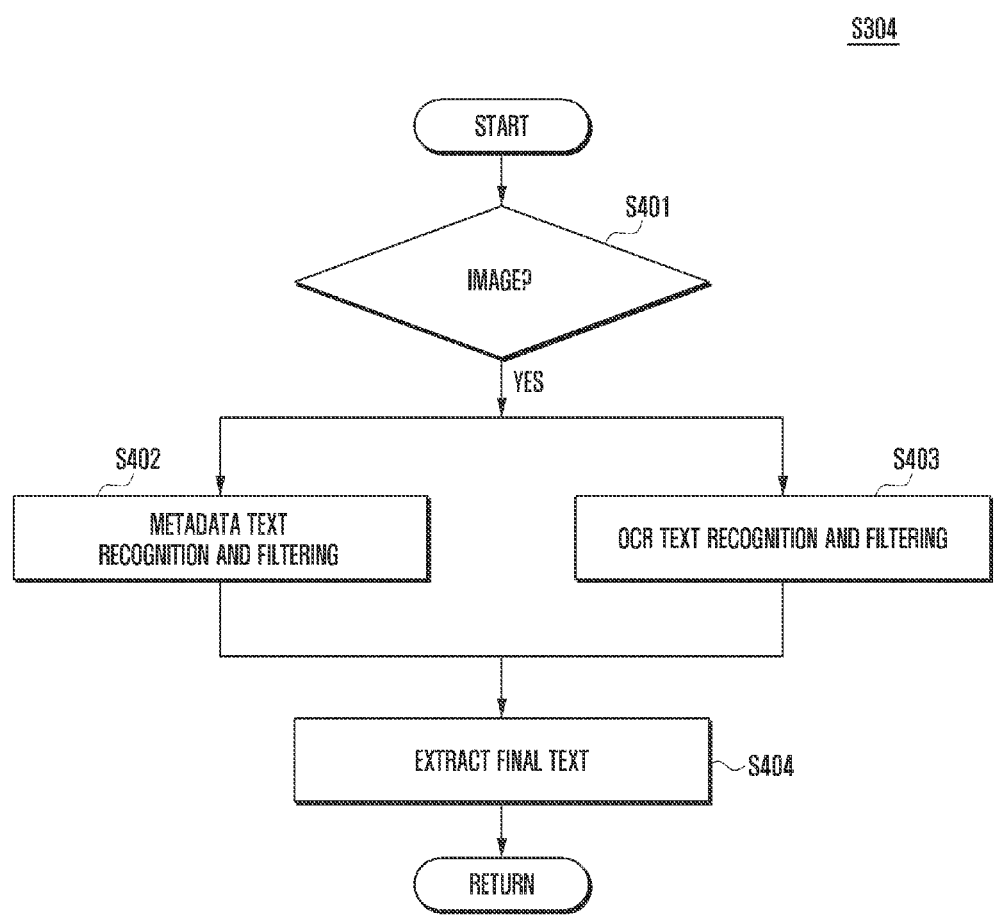
FIG. 4 is a flow diagram illustrating a detailed process of a text extraction operation illustrated in FIG. 3 according to an embodiment of the present disclosure.

FIG. 4 is a flow diagram illustrating a detailed process of text extraction operation illustrated in FIG. 3 according to an embodiment of the present disclosure.

Referring to FIG. 4, in detail the operation S304 is illustrated, in case a non-voice input is an image input at operation S401, the interfacing device 110 may recognize text of metadata contained in an image file and then perform a filtering process at operation S402, and/or may recognize text by performing OCR from the image file and then perform a filtering process at operation S403. If only one of the operations S402 and S403 is performed, text extracted through the performed operation is offered. However, if both operations S402 and S403 are performed, text extracted through one of such operations may be finally offered.

Referring back to FIG. 3, at operation S306, the interfacing device 110 checks the applicability of an associated content provider determined by the server 120 and then transmits a checking result to the server 120. At operation S307, the interfacing device 110 receives a result of dialogue recognition from the server 120 and then, based on the received result, executes a response to offer it to a user.

FIG. 5 is a table illustrating an example of determining an associated content provider at a server according to an embodiment of the present disclosure.

Referring to FIG. 5, in case text extracted by the interfacing device 110 is transmitted to the server 120, the associated content provider determining unit 121 may determine the type of the extracted text by analyzing words contained in the text. As illustrated in FIG. 5, if the extracted text is "8 Rue du Fouarre 75005 Paris, France" 501, this text contains the name of a country, the name of a city, and the name of a street, and therefore a text type may be determined as a location (address) 502. If the extracted text is "Samsung, Sennheiser, Ferrari" 504, a text type may be determined as a company name 505. If the extracted text is "Dark knight, Spider man" 507, a text type may be determined as a content name (movie) 508.

If a text type is a location (address) 502, a map service 503 may be offered as an associated content provider. If a text type is a company name 505, a search web 506 may be offered as an associated content provider. If a text type is a content name (movie) 508, a movie service application 509 may be offered as an associated content provider.

If a user accepts the applicability of an associated content provider offered to the interfacing device 110, the server 120 may request the interfacing device 110 to display thereon text-related information in the associated content provider. Namely, the interfacing device 110 may offer, as a response to text extracted from a user input, text-related information in the associated content provider to a user.

Figure 6A:
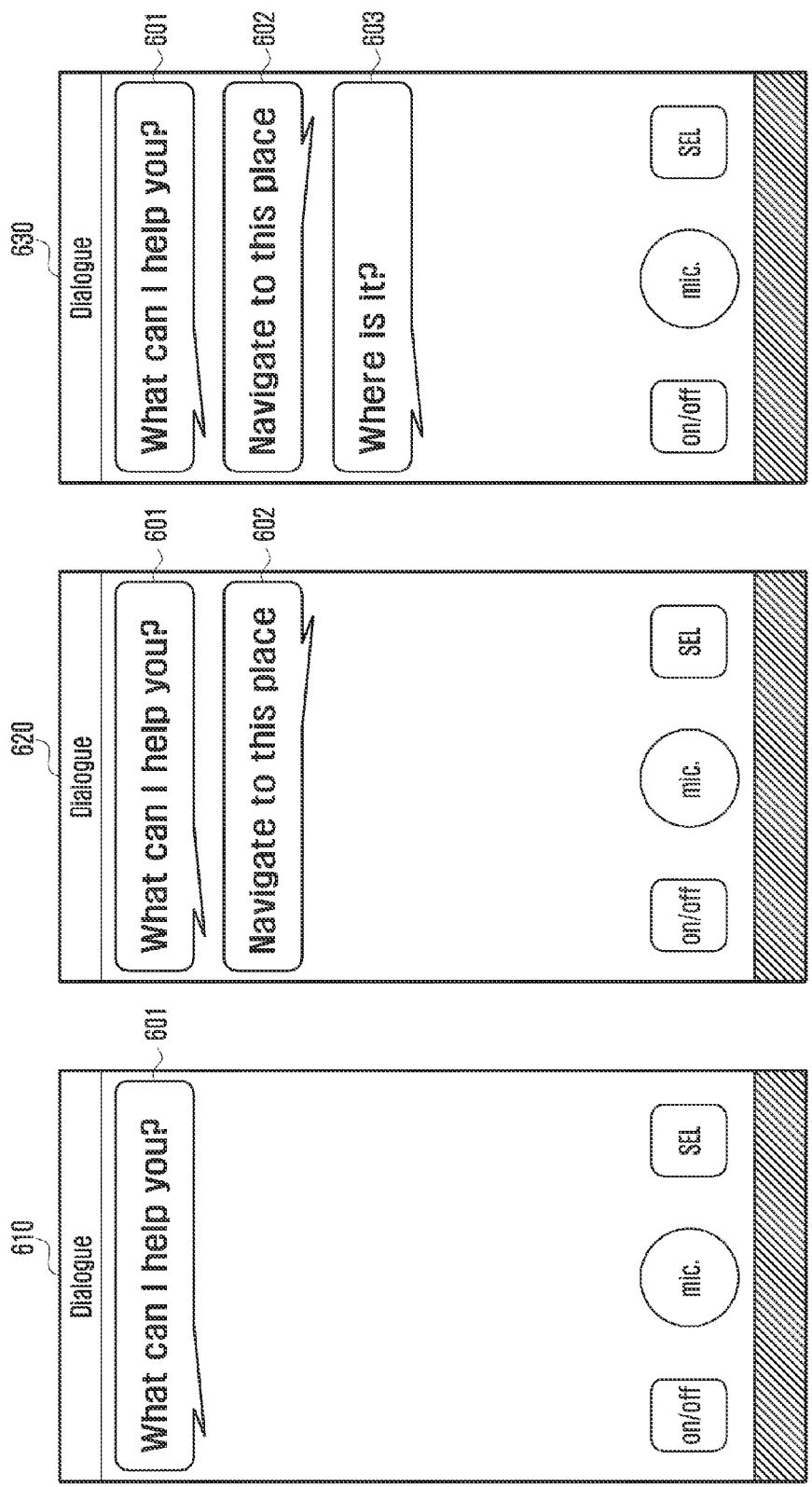
FIGS. 6A and 6B are screenshots illustrating a process of executing a speech dialogue service at an interfacing device according to embodiments of the present disclosure.
Figure 6B:
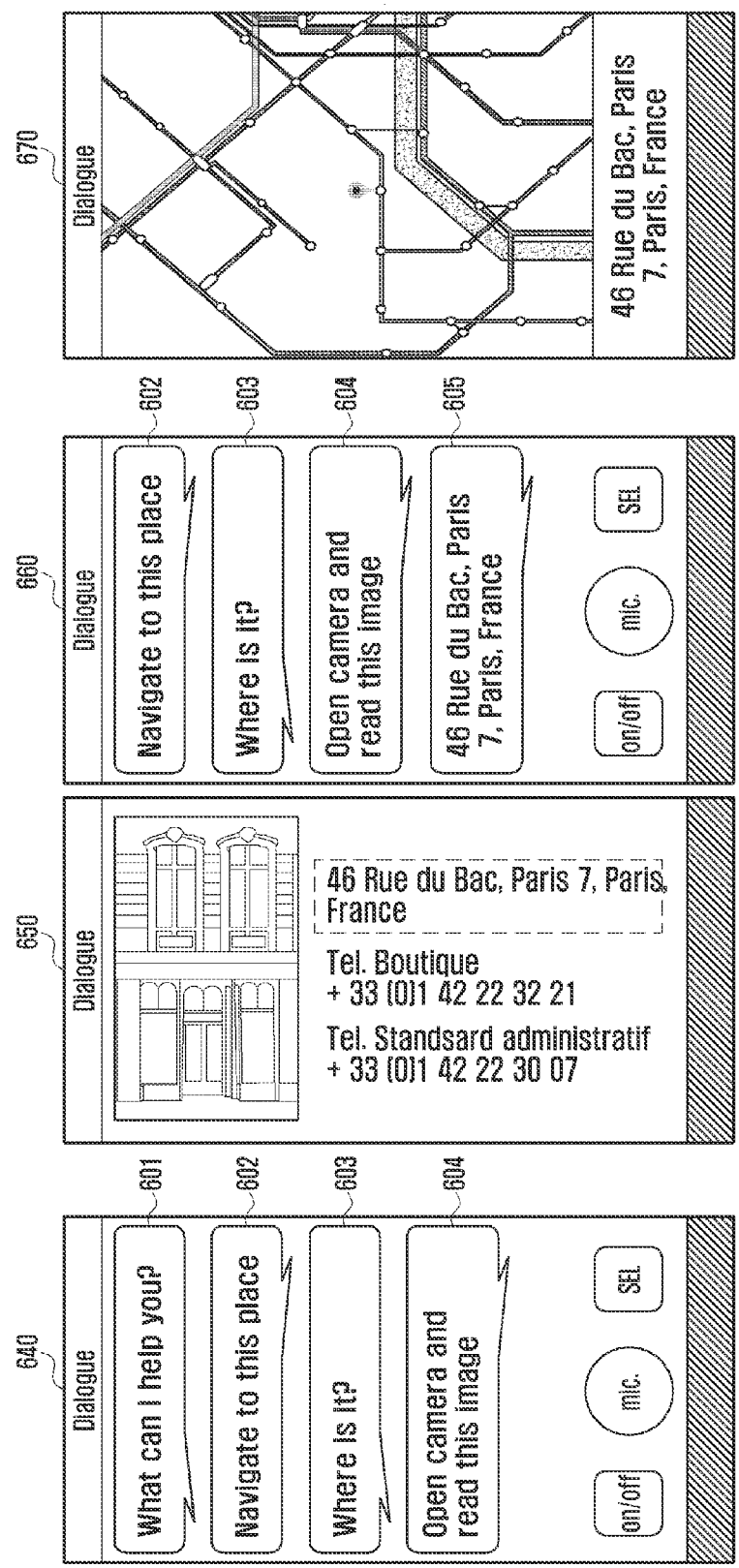

FIGS. 6A and 6B are screenshots illustrating a process of executing a speech dialogue service at an interfacing device according to embodiments of the present disclosure.

Referring first to FIG. 6A, the interfacing device 110 may display a dialogue between a user and a voice agent on the screen. In an embodiment, some icons such as an icon (on/off) for controlling an on-off status of a speech dialogue service, an icon (mic.) for controlling the activation of a microphone, an icon (SEL) for selecting an input mode, etc. may be displayed on the screen.

When a voice agent offers a comment 601 notifying a speech dialogue service as illustrated in screenshot 610, a user may offer, as a response, a voice input 602 to a voice agent as illustrated in screenshot 620. In this case, a user inputs a voice "Navigate to this place". In reply, a voice agent offers a response 603 corresponding to a user's voice input as illustrated in screenshot 630. In this case, a voice agent offers a response "Where is it?".

Referring to FIG. 6B, a switch of input modes and a response of an interface according to an image input is illustrated.

As illustrated in screenshot 640, a user may desire to offer an image input in response to a request of a voice agent and therefore require a switch of input modes. This switch of input modes may be performed using a voice command In this case, an input mode may be switched through a voice input 604 "Open camera and read this image".

Then, as illustrated in screenshot 650, the interfacing device 110 may capture an image by executing a camera and extract a text part from the captured image. For example, text contained in the captured image may be recognized through an OCR process, and a desired text part may be selected among the recognized text through a filtering process. As illustrated in screenshot 660, a text part 605 extracted from an image input may be displayed as a user response on the screen. Thereafter, a voice agent outputs a response to the extracted text part 605. Since the extracted text part 605 indicates a location (address), a voice agent may offer a map service for representing the location (address) as illustrated in screenshot 670.

As fully discussed hereinbefore, a speech dialogue service may be offered through various input interfaces other than a voice.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape and the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been illustrated and described with reference to various embodiments thereof, it will be understood by those skilled in the art that various changes in form and details may be made therein without departing from the spirit and scope of the present disclosure as defined by the appended claims and their equivalents.

What is claimed is:

1. An interfacing method for supporting a speech dialogue service, the interfacing method comprising:
   executing an interface for the speech dialogue service;
   receiving a user input, through the executed interface, including a voice input and a non-voice input, the non-voice input being an image input;
   transmitting, as a request signal to a server, at least one of the voice input or a text extracted from the voice input when the received user input is the voice input;
   transmitting, as the request signal to the server, a text extracted from the non-voice input when the received user input is the non-voice input;
   receiving a result of dialogue recognition in response to the request signal from the server; and
   executing a response to the received user input on the basis of the received result of dialogue recognition.

2. The interfacing method of claim 1, further comprising:
   setting an input mode of the interface based on a user control,
   wherein the setting the input mode comprises at least one of:
   selecting a menu of the input mode displayed on a screen in response to a input; or
   executing an application related to the input mode in response to a voice command.

3. The interfacing method of claim 1, wherein the method further comprises:
   recognizing text of metadata contained in the image input; and
   selecting a specific part among the recognized text through a filtering process.

4. The interfacing method of claim 1, wherein the method further comprises:
   recognizing text from the image input through an optical character recognition process; and
   selecting a specific part among the recognized text through a filtering process.

5. The interfacing method of claim 1, further comprising:
   receiving, from the server, a request for checking whether to apply an associated content provider determined by the server; and
   checking whether to apply the associated content provider determined by the server, and transmitting a result of the checking to the server.

6. The interfacing method of claim 5, wherein the executing of the response to the received user input comprises executing the associated content provider when applicability of the associated content provider is accepted.

7. An interfacing device for supporting a speech dialogue service, the interfacing device comprising:
   an input unit configured to receive a user input including a voice input and a non-voice input, the non-voice input being an image input;
   a communication unit configured to communicate with a server;
   a control unit configured to:
   execute an interface for the speech dialogue service, to receive the user input through the executed interface,
   transmit, as a request signal to the server, at least one of the voice input or a text extracted from the voice input when the received user input is the voice input,
   transmit, as the request signal to the server, a text extracted from the non-voice input when the received user input is the non-voice input,
   receive a result of dialogue recognition in response to the request signal from the server, and
   execute a response to the received user input on the basis of the received result of dialogue recognition; and
   an output unit configured to output a result of executing the response to the received user input.

8. The interfacing device of claim 7, wherein the control unit is further configured to set an input mode of the interface based on a user control, by performing at least one of selecting a menu of the input mode displayed on a screen in response to a input or executing an application related to the input mode in response to a voice command.

9. The interfacing device of claim 7, wherein the control unit is further configured to:
  recognize text of metadata contained in the image input, and
  select a specific part among the recognized text through a filtering process.

10. The interfacing device of claim 7, wherein the control unit is further configured to:
  recognize text from the image input through an optical character recognition process, and
  select a specific part among the recognized text through a filtering process.

11. The interfacing device of claim 7, wherein the control unit is further configured to:
  receive, from the server, a request for checking whether to apply an associated content provider determined by the server, and
  check whether to apply the associated content provider determined by the server, and to transmit a result of the checking to the server.

12. The interfacing device of claim 11, wherein the control unit is further configured to execute the associated content provider when applicability of the associated content provider is accepted.

13. At least one non-transitory processor readable medium for storing a computer program of instructions configured to be readable by at least one processor for instructing the at least one processor to execute a computer process for performing the method as recited in claim 1.

* * * * *